United States Patent [19]

Asano et al.

[11] 3,720,425

[45] March 13, 1973

[54] PROCESS AND APPARATUS FOR THE ADJUSTMENT OF THE HEIGHT OF THE CHASSIS OF A WHEELED VEHICLE

[75] Inventors: Tadao Asano; Noboru Murakami; Toru Akashi; Naoji Sakakibara, all of Kariya, Japan

[73] Assignee: Aisin Seiku Kabushiki Kaisha, Kariya City, Japan

[22] Filed: Aug. 4, 1970

[21] Appl. No.: 60,880

[30] Foreign Application Priority Data

Aug. 5, 1969 Japan................................44/61826
Aug. 6, 1969 Japan................................44/62571
Aug. 8, 1969 Japan................................44/62993

[52] U.S. Cl.............................280/124 F, 267/64 B
[51] Int. Cl.............................................B60g 17/00
[58] Field of Search...280/124 F, 6; 267/64, 65, 64 B

[56] References Cited

UNITED STATES PATENTS

| | | | |
|---|---|---|---|
| 3,147,966 | 9/1964 | Axthammer | 280/124 F |
| 3,250,525 | 5/1966 | Peterson | 267/64 B X |
| 3,552,766 | 1/1971 | Willich | 267/64 B |

*Primary Examiner*—Philip Goodman
*Attorney*—Sughrue, Rothwell, Mion, Zinn & Macpeak

[57] ABSTRACT

A pneumatic and hydraulic suspension device for vehicles is provided with a working cylinder having a plurality of communication or chassis level adjusting openings extending therethrough at different positions along the length thereof. A piston member is slidably received within the working cylinder to define two variable volume chambers on opposite sides thereof. Valve means are provided for controlling fluid communication between the two chambers the chassis level adjusting openings whereby the chassis height may be selectively adjusted through the automatic or manual control of the valve means.

16 Claims, 15 Drawing Figures

PATENTED MAR 13 1973

INVENTORS
TADAO ASANO
NOBORU MURAKAMI
TORU AKASHI
NAOJI SAKAKIBARA
BY Sughrue, Rothwell, Mion, Zinn & Macpeak
ATTORNEYS

PROCESS AND APPARATUS FOR THE ADJUSTMENT OF THE HEIGHT OF THE CHASSIS OF A WHEELED VEHICLE

This invention relates to an apparatus for the adjustment of the height of the chassis of a wheeled vehicle.

A standard type of the above kind of chassis height adjusting mechanism comprises a cylinder and a piston arranged slidable therein, wherein said piston is caused to reciprocate by vertical oscillating movement of the chassis during travel of the vehicle. An amount of liquid necessarily used for the adjustment of the chassis height is transferred from a certain chamber to another chamber, these chambers being provided within said mechanism, for performing a combined pneumatic and hydraulic adjusting operation for keeping the chassis height substantially constant value as possible, regardless of the occasional loaded condition of the chassis and acting upon suspension or mounting spring means provided between the chassis and the running gear of the vehicle.

In this kind of chassis height adjuster, the working cylinder is formed with only one communication opening serving for said adjusting operation. When the vehicle runs on an undulating surface, the chassis will naturally be subjected to an appreciable oscillation and the volume transferring liquid necessary for the height compensation may frequently be such that its quantity is larger than that of the returning liquid passing through said communication opening, resulting in a higher leveling of the chassis than is desired. In addition to this, a highly unstable leveling operation will be frequently invited by virtue of the same technical reason.

The main object of the present invention is to provide a chassis height adjuster capable of performing an improved operation by which the chassis height is adjusted positively to a higher and substantially corresponding level in case of the vehicle travelling on a more severely undulating traffic surface and vice versa for preventing otherwise possible interference between the chassis and the travel surface and a more pleasant riding feeling to the person or persons riding in the vehicle board.

According to the main feature of the present invention, the working cylinder provided in the height adjuster is formed with a plurality of communication or chassis level adjusting openings and flow interrupting means are provided in communication passage means extending between said openings and said one of the chambers for performing a selective adjustment of the chassis height.

These and further objects, features and advantages of the invention will become more apparent when read the following detailed description of several preferred embodiment of the invention by reference to the accompanying drawings.

Figures 1, 3:
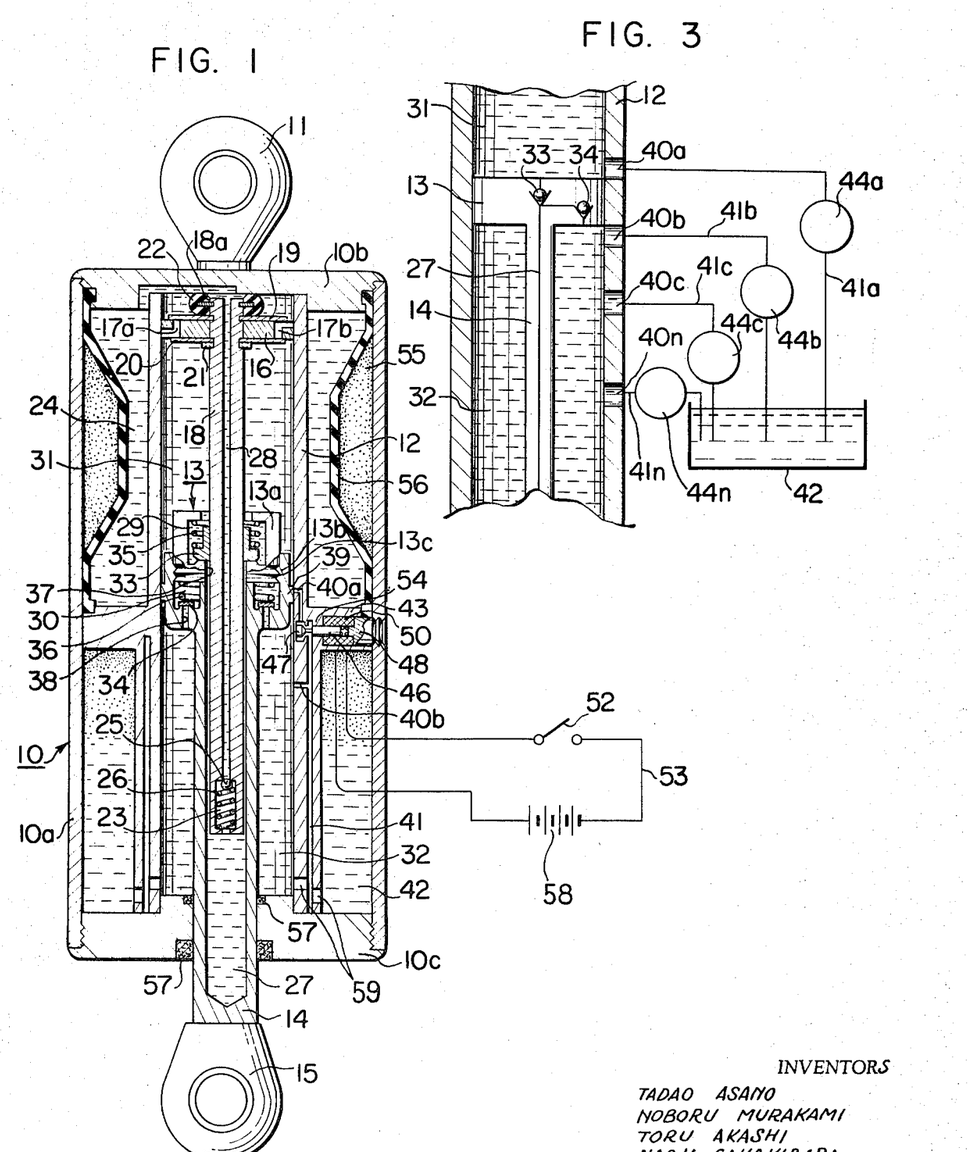
FIG. 1 is a longitudinal sectional view of a pneumatic and hydraulically operated chassis height adjuster in a first embodiment of the invention, wherein, an electric circuit is additionally and schematically shown.
FIGS. 3 and 4 are two modified arrangements from the foregoing of the hydraulic circuit employable in the present invention.

Referring now to the accompanying drawings, especially FIG. 1 thereof, numeral 10 generally denotes the main body of a suspension mechanism embodying the principles of the invention, said main body comprising a hollow outer cylinder 10a closed at its upper and bottom ends by cover plates 10b and 10c, respectively, by threading or the like conventional fixing means.

A socket 11 is fixedly attached to the upper cover plate 10b at its center as seen from the drawing, said socket 11 being adapted for being mechanically connected to a chassis frame of an automotive vehicle, not shown. An inner cylinder 12 is rigidly connected to the said outer cylinder 10a, as shown. A piston 13 is slidably mounted in said inner cylinder 12, said piston 13 being made integral with a piston rod 14, having its lower end a socket 15 which is mechanically connected in turn with an axle housing of an automotive vehicle, not shown.

A damping valve body 16 is fixedly mounted on the inside wall surface of said inner cylinder 12, said valve body being formed axially with two passages 17a and 17b.

A plunger 18 passes through said damping valve body 16 from below and is attached with upper and lower leaf valve members 19 and 20 normally contacting the upper and lower surfaces of said valve body 16, with a snap ring 21 keeping the relatively fixed position between the valve body 16 and the plunger 18.

A resilient bushing 22 is fixedly retained at the top end of said plunger 18 and between the upper leaf valve member 19 and the lateral projection 18a formed on the top extremity of said plunger.

By these structural elements, the damping valve assembly together with said plunger 18 is movably mounted relative to the cylinder assembly 10a; 12.

A chamber 23 is formed in the lower end part of plunger 18 and fitted with a relief valve 25 which is urged resiliently by a return spring 26, said valve being actuated upon by an exceptional increase of hydraulic pressure prevailing in a high pressure chamber 24 formed into a ring chamber at the upper part of the interior space of outer cylinder 10a and around the inner cylinder 12, as will be described more fully hereinbefore. Under the normal working condition of the suspension mechanism, however, the relief valve 25 is kept in its closed position so as to interrupt a passage 28 which is adapted for hydraulic connection of the high pressure chamber 24 with an elongated pumping chamber 27 formed in the rod 14.

Numeral 29 and 30 denote two chambers formed in the interior of said piston 13, said chambers being fitted with a pressure valve 33 and an inlet valve 34, respectively.

The pressure valve 33 is normally closed, so as to interrupt fluid communication between an inside working chamber 31 formed within the interior space of the inner cylinder 12 and at its outer part, on the one hand, and said pumping chamber 27, on the other hand. The inlet valve 34 is normally closed again, so as to interrupt fluid communication between the outer working chamber 32 formed within the interior of said inner cylinder 12 at its lower part, on the one hand, and said pumping chamber 27, on the other.

More specifically, these valves 33 and 34 are closed under the influence of respective urging springs 35 and 36, respectively, so as to close respective passage ways 37 and 38 formed through upper and lower piston elements 13a and 13b which are screwed together at 13c and constitute in combination said piston 13 of the composite type as shown.

The lower piston element 13b is formed on its outer peripheral surface with a ring projection 39 which is kept in slidable contact with the inner wall surface of the inner or working cylinder 12 and acts normally to maintain the height of the vehicle axle, not shown, in terms of the mutual distance between the upper and lower sockets 11 and 15 at predetermined value as possible.

A plurality of communication openings 40a, 40b, 40c . . . 40n, which may frequently be represented by a common single numeral 40 are formed laterally through the wall of cylinder 12 at different heights as most clearly seen from FIG. 4 and serve for chassis level adjustment purpose, as will be more fully described hereinafter. Each of these communication openings 40a – 40n are hydraulically connected through respective ducts 41a – 41n which may be represented by a single common numeral 41, said ducts being fitted with respective solenoid valves 44a – 44n. In practice, however, these ducts are formed in the wall of the cylinder 12 and kept in fluid communication with a reservoir 42. In FIG. 3, these solenoid valves are shown only schematically respective by small circles. High pressure chamber 24 and said reservoir 42 are separated by the provision of an intermediate separator wall 43 which serves at the same time for the rigid connection of the inner cylinder 12 with the outer cylinder 10a, the valve bodies of said solenoid valves being mounted in said wall 43 as schematically and representatively shown at 44. The valve body 44 is formed with a bore 45 which is normally kept in fluid communication with said duct 44. A plunger 46 is received slidably within said bore 45 and formed at its inner end rigidly with solenoid valve member 47. At the outer end of valve body 44, a plate member 48 is fixedly attached by screwing, à spring 49 being inserted under pressure between plunger 46 and plate member 48. Under these normal operating conditions, solenoid valve 47 being resiliently urged by the spring pressure at 49 and abutting against the inner end wall of valve body 44, as most clearly shown in FIG. 2. In this way, the duct or passage 41 is kept in fluid communication with the reservoir 42, as was briefly described in the foregoing.

A solenoid coil 50 is mounted in the valve body 44 and provided with an insulator sleeve 51 on the inside periphery of the solenoid as conventionally. The solenoid coil is inserted in an electric circuit 53 including a current source 58 and a switch 52. When closing this switch, current will be fed from the source 58 to the solenoid coil 50 which is thus energized and solenoid valve 47 is shifted outwardly against the action of spring 49 and brought into abutment with a valve seat 54 formed on the wall surface defining said bore 45, thereby the fluid communication between the latter and the passage 41.

A mass of a high pressure gaseous medium is sealed in the upper part of said reservoir 42 which is kept in hydraulic communication with the outer working chamber 32 through a plurality of communication openings 59 formed at a lower part of the inner cylinder 12.

A high pressure gas chamber 55 is formed into a ring-shaped space by the provision of a diaphragm 56 attached fixedly on the inside wall surface of the outer cylinder 10a and kept in separation from the high pressure liquid chamber 24. A dust seals 57 are provided around the rod 14 for assuring an effective seal against oil leakage from the chamber 32 and against invasion of foreign particles from outside of the mechanism into the chamber 32.

Figures 2, 4:
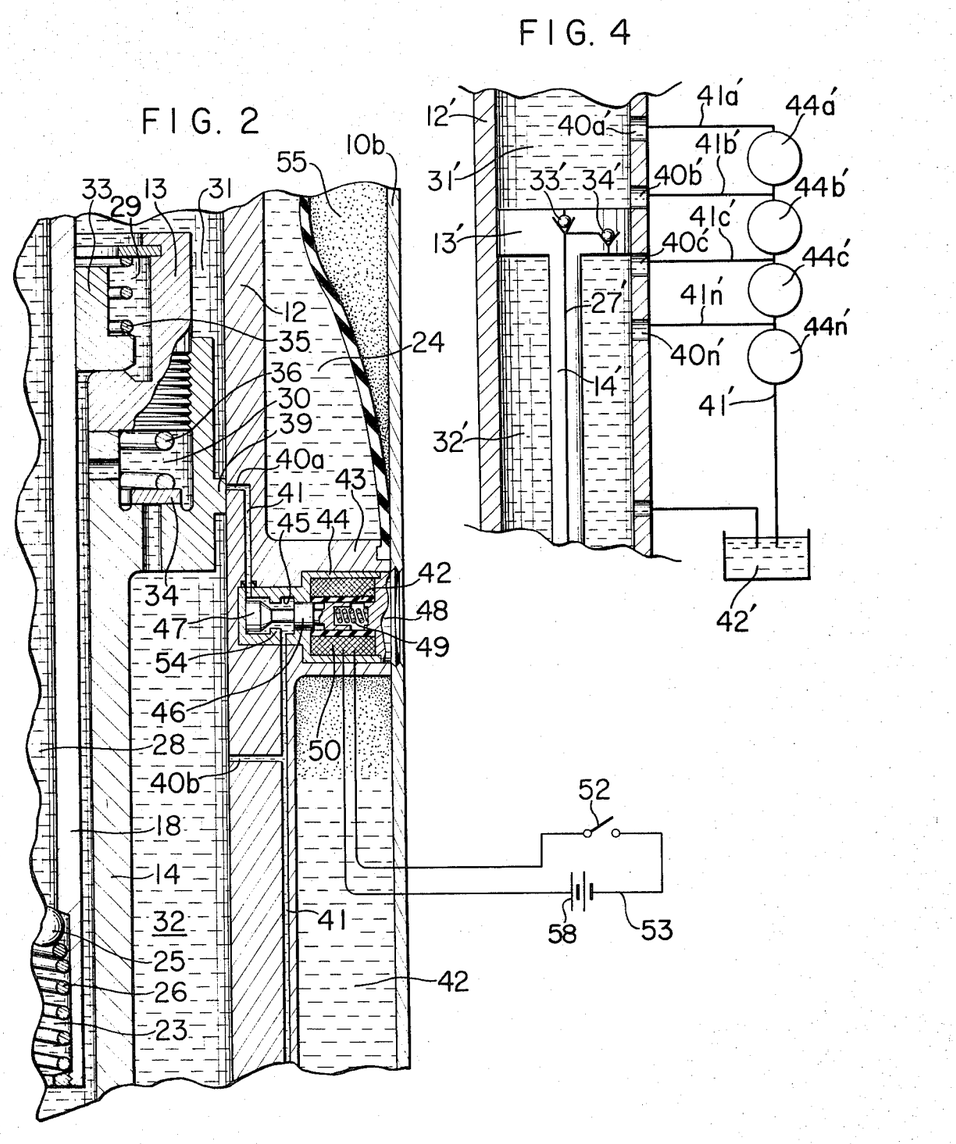
FIG. 2 is an enlarged sectional view of part of the mechanism shown in FIG. 1.

The operation of the suspension mechanism so far shown and described is as follows:

When the mechanism is caused to telescopically contract by virtue of the vehicle passing over a recess or the like depression on the traffic surface, the rod 14 is caused to elevate in its position from that shown in FIGS. 1 – 2, thereby causing pressure valve 33 in the chamber 29 formed in the composite piston 13 to be pushed upwards against the spring pressure and oil being conveyed from pump chamber 27 to chamber 31.

On the contrary, when piston rod 14 oscillates downwards, the volume of pump chamber 27 increased and a part of the liquid contained in the chamber 32 acts upon the inlet valve 34 in the chamber 30 against spring action 36 and flows into the pump chamber 27.

With upward oscillation of piston rod 14, a part of the liquid contained in the inner working chamber 31 will be conveyed therefrom through the passage 17a and urges damping valve 19 to open, causing the liquid to flow into the high pressure chamber 24, representing a considerable degree of damping effect, as may be easily understood from the description. On the contrary, a downward oscillation of piston rod 14 will cause liquid to pass through the passage 17b, thereby urging the damping valve 20 downward and flow into the inner working chamber 31. The pressure liquid fed into said chambers 24 and 31 will act upon the diaphragm 56 to compress the pneumatic gas prevailing in the high pressure chamber 55 and the hydraulic pressure acting upon the upper surface of the composite piston 13 will be correspondingly increased, thereby the piston being lowered in its position. If, at this stage the solenoid valve 47 made integral with plunger 46 is not actuated electromagnetically, the chassis of the vehicle will be kept at a position corresponding to the uppermost adjusting opening 40a irrespective of the oscillating movement of the chassis caused by occasional degree of undulations on the traffic surface, by virtue of the fluid communication of the opening 40a through duct or piping 41a with reservoir 42.

When, on the contrary, the solenoid valve 47 is actuated against the action of spring 49 until it abuts against valve seat 54 on the bore wall 45, the duct 41a will be interrupted. By this actuation, the piston 13 will be lowered and the chassis height will be adjusted to a somewhat lower position corresponding to the next lower opening 40b, and so on.

In the modification shown in FIG. 4, same or similar parts have denoted by respective same reference symbols, each attached with a prime. Therefore, the design and construction of the present modification will be obvious by reference to the foregoing disclosure.

In this modified arrangement, when solenoid valve 44a' is energizedly actuated so as to interrupt the passage or duct 41a', pressure liquid transferred from pump chamber 27' through pressure valve 33' into the chamber 31' is returned through duct 41b', thereby the chassis being held at a position corresponding to the second opening 40b'.

When solenoid valve 44b' is energized, the chassis will be adjusted to a next higher height corresponding to the next lower adjusting opening 40c, and so on.

Although, in the foregoing embodiments, solenoid valves have been used for the control service. But, it would be easily conceivable to use corresponding hydraulically operated valves in place of the solenoid valves and, indeed, with equal results.

In the second embodiment shown in FIGS. 5-8, the chassis height adjustment is carried out in response to the occasional vehicle speed, as will be more fully described hereinafter.

In these figures, the numeral 61 denotes the main body of an automotive vehicle suspension mechanism, the uppermost part of which is designed arranged to be mechanically connected through a threaded member 62 made integral therewith, to the chassis of an automotive vehicle, again not shown. On the other hand, the lower end of said suspension is mechanically connected through a rod 65 of a piston 64 slidably mounted in a working cylinder 63 made rigid with the main body, and a socket 56 made rigid with said rod, with an axle housing of the vehicle as before.

Figures 5, 7, 8, 10:
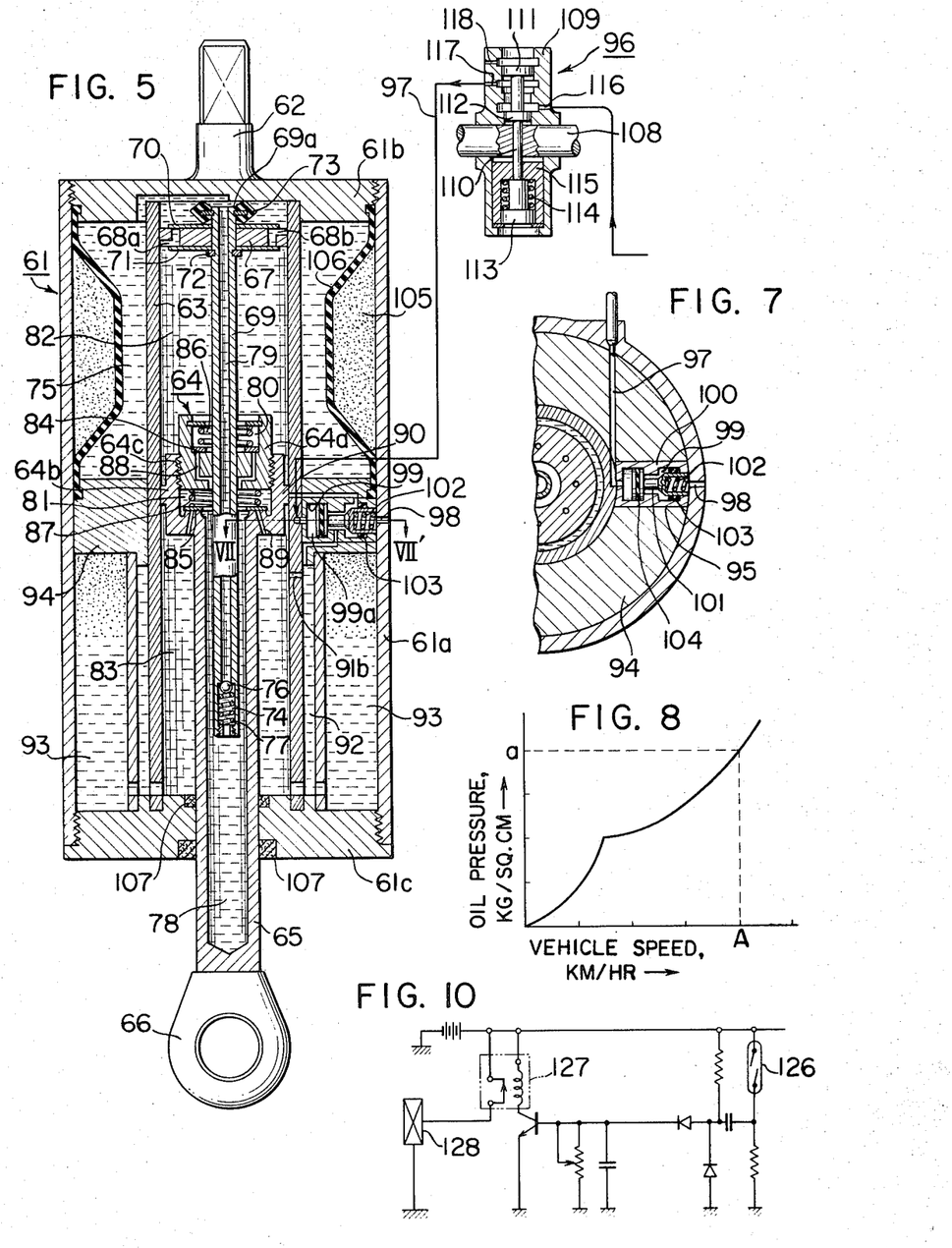
FIG. 5 is a substantially similar view to FIG. 1, illustrative, however, of a second embodiment of the invention, the operating conditions being at a high speed running of the vehicle.
FIG. 7 is a part of a cross-sectional view substantially taken on the section line VII — VII' in FIG. 6.
FIG. 8 is a characteristic curve of the hydraulic pressure function of the vehicle speed, as appearing in a governor unit employed in the second embodiment of the invention.
FIG. 10 is a schematic chart for showing a still further modified vehicle speed senser.

Numeral 67 denotes a damping valve body which is fixedly positioned at a certain predetermined height within the interior space of the inner or working cylinder 63, as in the foregoing manner, for instance, by press fit or the like conventional fixing means, said valve body being formed axially with two perforations or passages 68a and 68b, respectively. Numeral 69 denotes a plunger which snugly passes through the valve body 67. Damping valves 70 and 71 in the form of leaf valves are attached to the upper and lower surface of the valve body, as before. Snap ring 72, bushing 73 and the plunger top 69a are designed and arranged in the similar manner again as before. Valve chamber 74, relief valve 76 and return spring 77 are designed and arranged as before at the lowermost end of said plunger. This relief valve 76 is caused to actuate when the liquid pressure prevailing in the high pressure chamber is caused to elevate to an exceptionally high value. The relief valve 76 is normally kept in its closed position for interrupting a liquid flow through a passage 79 fluidically connecting a pump chamber 78 and said high pressure chamber 75.

A composite piston 64 is formed rigidly at the top end of piston 65 and comprises two chambers 80 and 81 in the interior of said piston. In the similar way as before, these chambers 80 and 81 are fitted with a pressure valve 84 and an inlet valve 85, respectively, as before. These valve 84 and 85 close normally respective passages 88 and 89, respectively, under the action of respective springs 86 and 87. Numeral 90 represents a ring projection formed on piston 64 in the similar manner as that which has been shown at 39 in FIG. 1.

The cylinder 63 is formed with a plurality of chassis level adjusting openings 91a, 91b, 91c . . . 91n, which correspond to 40a, 40b, 40c . . . 40n, respectively. The purpose is the same as before. Ducts or passages generally shown at 92 are similar to 41, which lead to a reservoir 93 which is similar to that 42 in the foregoing.

Numeral 94 denotes an intermediate separator wall which has been denoted 43 in the foregoing.

In the wall 94, there is provided a change-off valve body 95 which is formed with a bore 99 having a valve seat 100, said bore being kept in fluid communication with passages 92, 97 and 98, of which the passage 97 extending to governor unit 96. The passage 98 is open to the outside atmosphere for venting purpose. Numeral 101 denotes a valve member which is slidably received in the bore 99 for changing off said chassis level adjusting openings and urged resiliently by means of a spring 102 to move inwardly in FIGS. 5 and 7. With the valve member 101 kept in abutting relation with valve seat 100, a fluid communication between the adjusting opening 91a and the passage 92. A sealing means 103 is provided within said bore 99, thereby preventing any outward leakage of the liquid contained in the interior of the combined pneumatic and hydraulic suspension mechanism according to this invention. There is another sealing means 104 provided within said change-off valve 101 for the prevention of the mixing of the liquid. Reservoir 93 contains a certain quantity of high pressure gas as in the case of the chamber 42 in FIGS. 1 and 2, said reservoir being kept in hydraulic communication with outer working chamber 83, in the similar way as before.

Numeral 105 denotes a high pressure gas chamber defined by a resilient diaphragm 106 in the similar way at 55 and 56 in the foregoing. Dust seals 107 are provided as at 57 in the foregoing.

In the following description, the governor unit 96 will be described more in detail, in combination with the functional feature of the suspension mechanism. Governor unit 96 is conventional per se and constructed and shaped into a hydraulic governor unit for providing a speed change instruction signal adapted for the control of clutches and stationary brake bands in a conventional automotive planetary speed change unit.

The governor unit comprises a governor body 109 which is fixedly mounted on a conventional automotive propeller shaft 108, said main body being provided with a movable upper valve element 111 and a lower valve element 112. These valve elements 111 and 112 are mechanically connected with each other by means of a valve stem 110 which passes laterally through said propeller shaft 108. Within the main body 109, two centrifugal masses 113 and 115 are provided in a mutually slidable relation with each other, a compression spring 114 being inserted between the weight masses 113 and 115. Mutual hydraulic connection between oil supply opening 116 and oil pressure adjusting opening 117, both openings being formed the rough the wall of said main body. By the unitary sliding movement of these weight masses, fluid communication between the openings 116 and 117 is established or interrupted, as the case may be. Also, an oil discharge opening 118 bored again through the wall of said body is on-off controlled.

With the governor main body 109 kept stationary, pressure oil fed-in through supply opening 116 is conveyed into an intermediate space formed between the upper and lower valve members 111 and 112, thereby causing these valve members to be moved upwardly in FIG. 5, thus being further separated from the shaft 108. The lower valve 112 is brought into its closing position relative to oil supply opening 116. Said upward movement of the valve members 111 and 112 is caused by virtue of a difference in their pressure-receiving areas. Under these operating conditions, any appreciable liquid pressure will not develop in a chassis level change-off valve chamber 99a formed in the bore 99 of the valve body 95 and the valve member 101 is urged by spring 102 to interrupt the passage 92.

With rotational movement of the governor main body 109 and with gradually increased rotational speed thereof, the valve members 111 and 112 are caused to move downwards in FIG. 5 under the centrifugal force exerted by the rotating weight masses 113 and 115, thereby the supply opening 116 being brought into its opened state. Pressure liquid will therefore be conveyed to the intermediate space between the valve members 111 and 112, these valves being caused thereby to move upwards under the influence of the thus supplied oil pressure. With further and appreciable increases of the governor rotation and with corresponding increase of the thus created centrifugal force, the valve members 111 and 112 will move downwards in FIG. 5, and pressure oil will be supplied to the space between the valve members 111 and 112, thence through the pressure adjusting opening 117 to said duct or passage 97, and further into the change-off valve chamber 99a. In this way, the change-off valve 101 is caused to shift against the action of spring 102. Thus, the hydraulic communication through the passage 92 adapted for establishing fluid communication between the opening 91a and said reservoir 93 is interrupted.

On the contrary, when the rotational speed of the governor body 109 should lower below a certain predetermined value, the oil pressure acting on the valve members 101 and 102 will be balanced at a certain value by the centrifugal force induced in the rotating weight masses 113 and 115, thereby blocking oil supply opening 116 by the lower valve member 112. However, if the said balanced condition is broken by a reduction in the centrifugal force induced in the weight masses and the hydraulic pressure becomes larger than the centrifugal force, the valve members 111 and 112 will shift upwards in FIG. 5, thereby causing oil inlet opening 108 to be brought into its opened condition. Thus, pressure oil flowing reversedly from the valve chamber 99a to pressure adjusting opening 107 is discharged through the discharge opening 118. During this operational stage, the oil pressure will vary gradually along a characteristic curve, such as shown in FIG. 8, from a higher value to a lower value.

With use of the suspension mechanism as constructed in the second embodiment, the hydraulic pressure varying in function of the varying rotational speed of the propeller shaft 108 is sensed and utilized as an instruction signal. For instance, in FIG. 8, the change-off valve 101 is designed and arranged to actuate against the spring pressure at 102 at a certain governor pressure "a" corresponding to a predetermined vehicle speed "A", to interrupt the oil passage 92 for performing a change-off operation from opening 91a to 91b. Even in the wheel speed range higher than said predetermined value "A", the opening 91a is kept in communication through said passage 92 with the reservoir 93, the operating conditions of the constituent parts of the mechanism are brought to those shown in FIG. 6, thus the chassis height is reduced to a certain smaller value and a more stabilized running of the vehicle is thus brought about.

Figures 6, 9:
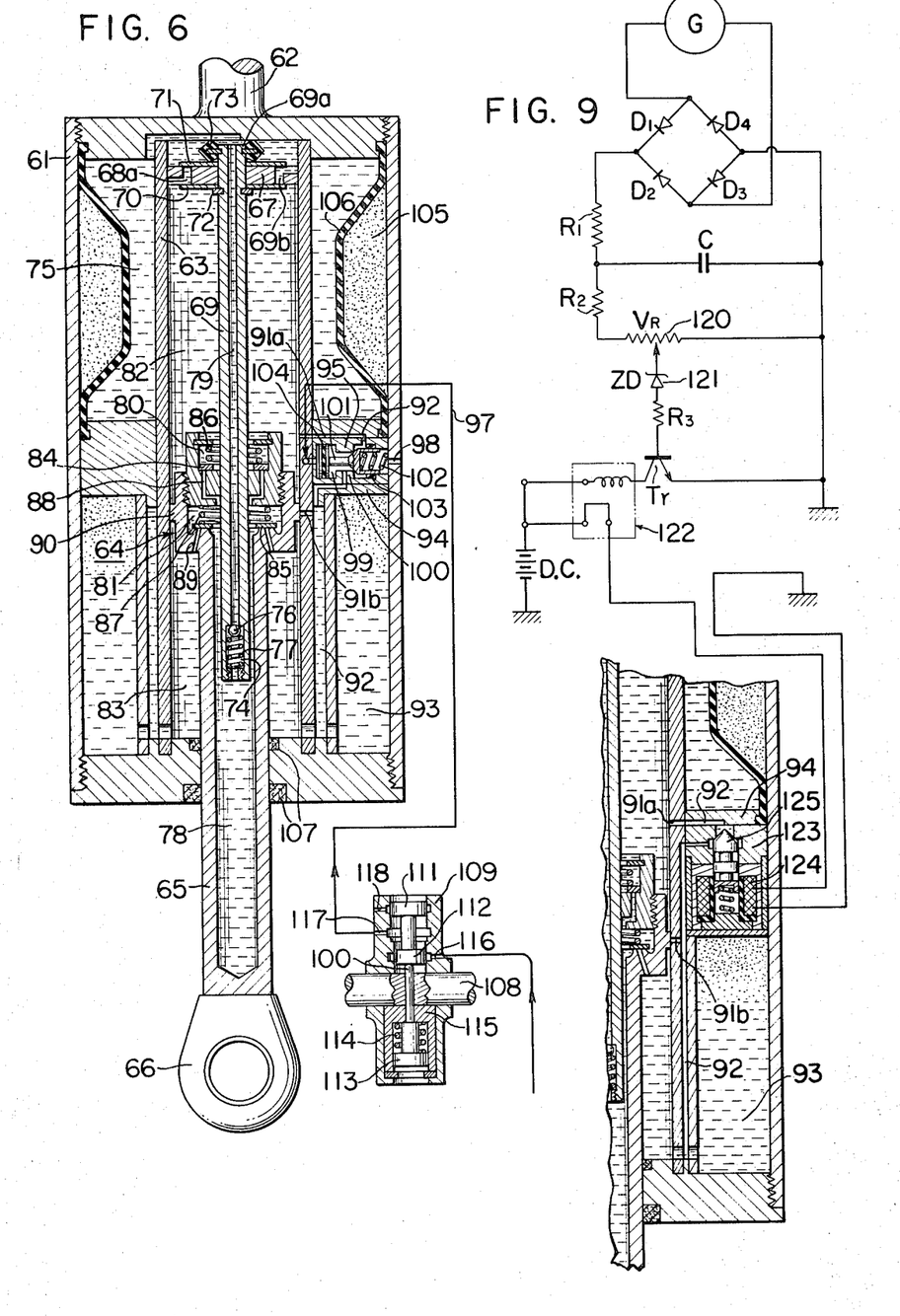
FIG. 6 is a similar view to FIG. 5, illustrating, low speed running conditions of the vehicle.
FIG. 9 is a longitudinal sectional view of part of a third embodiment of the invention, being attached, with a modified design and arrangement of the vehicle speed sensing means.

When the vehicle speed lowers said preset value "A", the passage 92 adapted for keeping fluid communication between the opening 91a and the reservoir 93 is brought into interruption and thus, the chassis height is increased correspondingly for avoiding a possible interference between the chassis and the traffic surface. In this way, a more pleasant drive feeling will assured to the driver and passengers.

Next, referring to FIGS. 9 and 10, a modified arrangement is shown, wherein the instruction signal is replaced by an electrical signal in place of the hydraulic signal. In this modified arrangement, the change-off actuator is made into a solenoid valve.

In FIG. 9, the voltage induced in a generator 119 which is coupled with the propeller- or the like shaft means fitted in the vehicle, although not shown, and thus being responsive to the vehicle speed (in terms of the rotations), will become increased with increase of the vehicle speed. The thus induced voltage is conveyed to a bridge comprising diodes D1 – D4 and through a circuit comprising several circuit elements R1, R2, C, 120, 121 and R3 to a transistor Tr to relay 122. When an increased voltage in function of the increased vehicle speed, is higher than that preset by the voltage adjuster 120 and Zener diode 121, said relay 122 is brought into actuation and a solenoid 124 fitted in a valve body 123 mounted in a stationary part 94 in the mechanism. In this way, the chassis height-adjusting opening 91a is brought into fluid communication with the reservoir 93, thereby causing chassis height to be reduced, and vice versa.

In a still further modified arrangement shown in FIG. 10, a pulse generator 126 is used which is designed and arranged to deliver a voltage in response to occasional vehicle speed. When the delivered voltage exceeds a predetermined value adjustably preset by several circuit components shown in FIG. 10, relay 127 is brought into actuation as before, so as to operate a solenoid 128 which corresponds to that denoted 124 in FIG. 9.

Figure 11A:
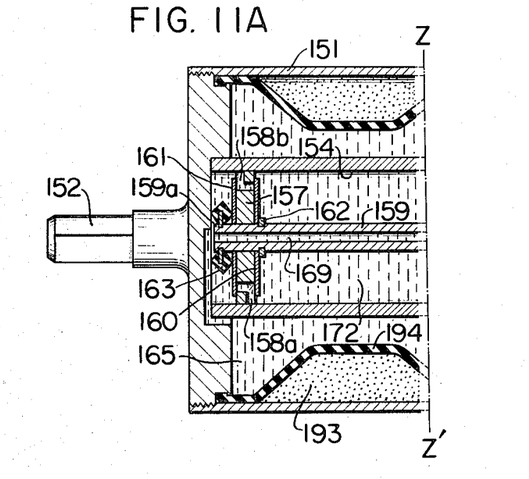
FIGS. 11A and 11B represent in combination a single drawing, the separating line being denoted at Z—Z' and said drawing representing a longitudinal section of a fourth embodiment of the invention, being, attached with an electric and electronic circuit adapted for cooperation therewith.
Figure 11B:
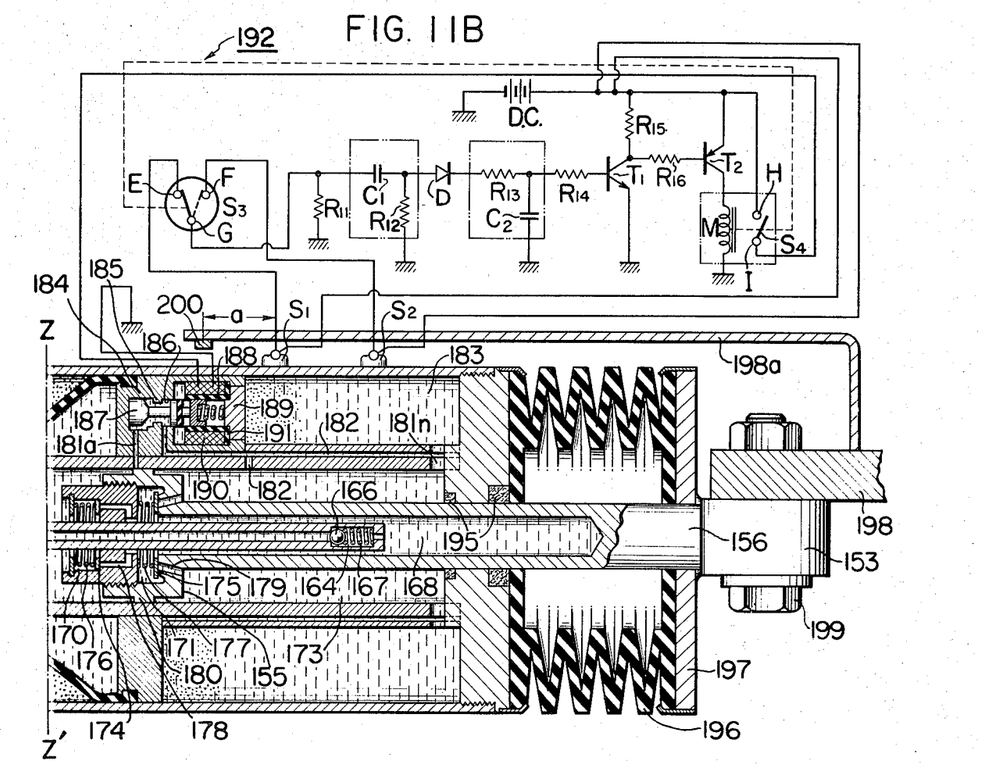

Finally, referring to FIGS. 11 – 14, the fourth embodiment of the invention will now be described. FIG. 11 consisting of two FIGS. 11A and 11B, has been drawn horizontally instead of vertically, in consideration of the drawing space.

Main working parts of the present embodiment are substantially similar to those employed in the foregoing second embodiment shown in FIGS. 5 – 7, regardless of minor changes in their physical configuration. Therefore, the detailed structure and function of these main working parts can be well understood from the foregoing disclosure of the second embodiment. Reference to the following list of parts, shows the correspondency between the two embodiments.

| Fourth Embodiment | Second Embodiment |
| --- | --- |
| 151 | 61 |
| 152 | 62 |
| 153 | 66 |
| 154 | 63 |
| 155 | 64 |
| 156 | 65 |
| 157 | 67 |
| 158a | 68a |
| 158b | 68b |
| 159 | 69 |
| 159a | 69a |
| 160 | 71 |
| 161 | 70 |
| 162 | 72 |
| 163 | 73 |
| 164 | 74 |
| 165 | 75 |
| 166 | 76 |
| 167 | 77 |
| 168 | 78 |
| 169 | 79 |
| 170 | 80 |
| 171 | 81 |
| 172 | 82 |
| 173 | 83 |
| 174 | 84 |
| 175 | 85 |
| 176 | 86 |
| 177 | 87 |
| 178 | 88 |
| 179 | 89 |
| 180 | 90 |
| 181a | 91a |
| 181b | 91b |
| 181n | 91n |
| 181 | 91 |
| 182 | 92 |
| 183 | 93 |
| 184 | 94 |
| 185 | 100 |
| 186 | 99 |
| 187 | 95 |
| 188 | 103 |
| 189 | 102 |
| 190 | 124 |
| 193 | 105 |
| 194 | 106 |
| 195 | 107 |

In the present embodiment, the insulator sleeve attached to the solenoid 190 is denoted with 191, although in the second embodiment the sleeve has not been shown with a specific symbol. The solenoid 190 is electrically connected with a control circuit 192 to be described.

In the present embodiment, a dust cover 196 is inserted between the main body 151 and a plate member 197 fixedly attached to the rod 156, for preventing a possible invasion of foreign particles from outside of the mechanism, and at the same time, acting as a kind of stopper. Numeral 198 denotes a bracket which is fixed to a proper member of the running gear of the vehicle, not shown. This bracket is formed with an elongated arm 198a which extends in the sliding direction of the piston 155, a magnet 200 being attached to the top end of said arm.

On the outer peripheral surface of said main body 151 in the form of an outer cylinder as before, there are mounted two lead switches S1 and S2 at a small mutual distance and electrically connected with said control circuit 192. Lead switches S1 and S2 are connected to contacts E and F of a transfer switch S3, while they are connected at their opposite side with a battery DC. Transfer switch S3 is connected from G through resistor R11 to a differentiating circuit comprising a condenser C1 and an earthed resistor R12, thence further through diode D to an integral circuit comprising a resistor R13 and an earthed condenser C2. The integral circuit is connected through resistor R14 to a transistor T1, one side of which is earthed, one side being branched off to resistors R15 and R16. Resistor R15 is connected to battery DC, while resistor R16 is connected to transistor T2, further connecting mode thereof being clearly understood from the drawing. Symbol "M" denotes a relay coil. "T2" represents a further transistor, the circuit including the latter comprising a relay switch S4 comprising stationary contact "H" and a movable contact "I". These components are connected as shown. Movable contact "I" is connected with solenoid 190 which is mounted in the separator wall 184. Contacts "E" and "G" are normally closed, while contacts "F" and "G" are normally opened. Contacts "H" and "I" are normally opened.

The operation of the fourth embodiment of the invention is as follows.

Figure 12:
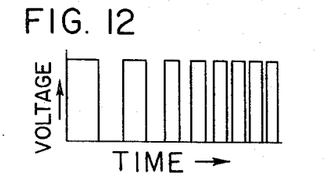
FIG. 12 is a chart of a series of pulse voltages which are issued from a control circuit part shown in FIG. 11.
Figure 13:
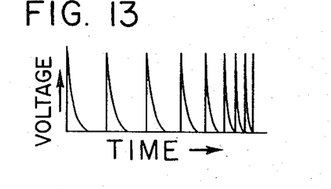
FIG. 13 is a chart showing differentiated pulse series delivered from said control circuit part.
Figure 14:
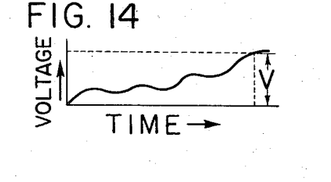
FIG. 14 is a chart showing an integrated wave curve delivered from said control circuit part.

When the vehicle is assumed to travel along a non-paved traffic road representing appreciable undulations, the vehicle will be naturally subject to oscillations with substantial amplitudes and/or at a more frequent frequency. In this case, the piston 155 will be subject to an appreciable and frequently repeated oscillation and the magnet 200 fixed on the arm 198a will perform similar oscillation. When the piston oscillates at a larger amplitude than the distance defined between said magnet 200 and said switch S1, pulse voltages will be induced control circuit 192. When the oscillation becomes more frequent and the amplitude represents a larger value the frequency of the thus induced pulse voltage will become increased as shown in FIG. 12 and 13. Thus, the integrated voltage in the integration circuit will become increased, as shown in FIG. 14. When the pulse voltage obtained in the integration circuit exceeds a predetermined value "V" and the contacts "H" and "I" of relay switch S4 are brought into mutual contact, current will flow through said control circuit 192, thereby causing solenoid 190 to become energized. In this way, the change-off or transfer valve 187 is actuated to move against the action of spring 189, so as to interrupt the flow passage 182 leading from the highest opening 181b, thereby the chassis height is increased correspondingly. At the same time, the transfer switch is transferred from contacts E-G to F-G.

When it is assumed that the vehicle travels along a more unfavorable traffic surface and thus the vehicle is subjected to more severe oscillations having a still more frequent frequency and a more larger amplitude, the pulse voltages developing between magnet 200 and lead switch S2 will become still higher. Under such operating conditions, contacts H and I of relay switch S4 remain in their closed position and solenoid 190 is kept in its unenergized position. Therefore, the chassis height is kept as before, relying upon said level-adjusting opening 181b.

On the contrary, when the vehicle travels along a favorable road surface such as the paved highway and the vehicle is subjected to less amplitudes at a smaller frequency, the pulse voltages developed by the cooperation between magnet 200 and lead switch S2 will become smaller and the integrated voltage in the integration circuit will be reduced correspondingly, and possibly, below the preset value "V". In this way, relay switch S4 is opened and solenoid 190 is not energized. Passage 182 connecting hydraulically between one of the chassis-height adjusting openings at 181a and the reservoir 183 is brought into fluid communication. The height adjustment is performed by relying upon this opening 181a, therefore, the height of the chassis is reduced. At the same time, transfer switch S3 is transferred from F–G to E–F.

By modifying the resistance valves R11 – R16 and the mutual distance between magnet 200 and switches S1 and S2, being shown at "a" in FIG. 11B, the control circuit may be modified for better adaptation of the traffic and other conditions.

The embodiments of the invention in which an exclusive property or privilege is claimed are as follows:

1. In a suspension mechanism for a vehicle having a sprung mass and an unsprung mass, the improvement comprising: a main body selectively attached to either of said sprung mass and unsprung mass, a working cylinder rigid with said main body, fluid contained in said working cylinder, an elongated rod member attached to the remaining one of said sprung mass and unsprung mass, a piston formed integrally with said rod member and slidably received in said working cylinder, two working chambers of variable volumes formed in the interior of said working cylinder by said slidable piston, valve means operable in response to the sliding movement of said piston for controlling fluid communication from one of said two chambers to the other of said two chambers, a plurality of chassis-height adjusting openings formed through the wall of said working cylinder, each of said openings being spaced axially from each other on said cylinder for controlling the passage of fluid through said openings in response to the sliding movement of said piston, passage means adapted for communicating said two chambers with each other through said adjusting openings, and further valve means for selectively interrupting said passage means and a selected opening so that fluid in the other of said two chambers is returned to said one of said two chambers through one of said passage means and corresponding opening controlled by said slidable piston.

2. Suspension mechanism as claimed in claim 1, wherein said valve means adapted for selective interruption of said passage means is of manually controlable type.

3. Suspension mechanism as claimed in claim 1, wherein said valve means adapted for selective interruption of said passage means is of such type that it is actuated automatically in response to the traveling conditions of said vehicle.

4. Suspension mechanism as claimed in claim 1, wherein respective passage means adapted for fluid connection between said two chambers through said opening means are fitted with selective valve means in parallel to each other for selective interruption of respective passage means.

5. Suspension mechanism as claimed in claim 1, wherein a plurality of valve means are connected in series one after another in said passage means for performing selective connection between said two chambers through respective passage means.

6. A suspension mechanism as claimed in claim 1, further comprising a plunger received in a cavity formed in said rod member to define a pumping chamber, said valve means adapted for operation in response to the sliding movement of said piston comprising a first valve for controlling fluid communication between said one of said two chamber and said pumping chamber and a second valve for controlling fluid communication between said pumping chamber and the other of said two chambers.

7. Suspension mechanism as claimed in claim 2, wherein said valve means are solenoid valves operatable by actuation of respective solenoids which are energized and de-energized by on-off operation of switch means.

8. Suspension mechanism as claimed in claim 3, wherein said valve means is automatically actuated by an instruction signal which is delivered in response to the occasional vehicle speed.

9. Suspension mechanism as claimed in claim 3, wherein said valve means is actuated automatically by an instruction signal sensed in response to the amplitude and the vibrations of the vehicle unsprung mass.

10. Suspension mechanism as claimed in claim 8, wherein said instruction signal is a liquid signal.

11. Suspension mechanism as claimed in claim 10, wherein said liquid signal is delivered from a hydraulic governor unit.

12. Suspension mechanism as claimed in claim 8, wherein said instruction signal is an electrical signal.

13. Suspension mechanism as claimed in claim 12, wherein said electrical signal is delivered from a generator and in the form of induced voltage therein, said generator being coupled mechanically with a propeller shaft or the like of said vehicle.

14. Suspension mechanism as claimed in claim 12, wherein said electrical signal is delivered from a pulse generator.

15. Suspension mechanism as claimed in claim 9, wherein said instruction signal sensed in response to the amplitude and number of oscillations is an electrical signal.

16. Suspension mechanism as claimed in claim 15, wherein further comprising means in response to amplitude and number of vibrations, comprises in combination:

at least one lead switch mounted on the outer surface of said main body of the suspension mechanism, a magnet mounted on a member secured to said rod member and adapted for on-off control of said lead switch in response to the oscillation amplitude of said vehicle, and a control circuit arranged to cooperate switch and said magnet for generating pulse voltages.

* * * * *